United States Patent

Bell et al.

[11] 3,900,866
[45] Aug. 19, 1975

[54] APPARATUS FOR AND METHOD OF GRAPHICAL RECORDING

[75] Inventors: Barry A. Bell, Glenside; Edward L. Weiss, Quakertown, both of Pa.

[73] Assignee: Leeds & Northrup Company, North Wales, Pa.

[22] Filed: Feb. 11, 1974

[21] Appl. No.: 441,204

Related U.S. Application Data

[63] Continuation-in-part of Ser. No. 270,327, July 10, 1972, Pat. No. 3,793,638.

[52] U.S. Cl. .................. 346/1; 118/50; 346/140
[51] Int. Cl. ............................................ G01d 15/16
[58] Field of Search .......... 346/140, 1; 118/50, 326, 118/300, 410; 117/102 L

[56] References Cited
UNITED STATES PATENTS

| | | | |
|---|---|---|---|
| 1,728,043 | 9/1929 | Christman | 33/41 F |
| 3,077,859 | 2/1963 | Cook | 118/326 |
| 3,141,793 | 7/1964 | Oliphant | 118/300 |
| 3,146,058 | 8/1964 | Henshaw | 346/140 |
| 3,237,748 | 3/1966 | Rifkin | 197/181 |
| 3,384,965 | 5/1968 | Sicking | 33/18 R |

Primary Examiner—Joseph W. Hartary
Attorney, Agent, or Firm—Woodcock, Washburn, Kurtz & Mackiewicz

[57] ABSTRACT

In a recorder ink pen, a substantial and continuous flow of ink moves between a discharge port and a vacuum port in communication with a record receiving medium. The vacuum port which substantially surrounds the discharge port confines the area of contact between the record receiving medium and the ink.

19 Claims, 5 Drawing Figures

APPARATUS FOR AND METHOD OF GRAPHICAL RECORDING

CROSS-REFERENCE TO RELATED APPLICATION

This is a continuation-in-part of application Ser. No. 270,327 filed July 10, 1972, now U.S. Pat. No. 3,793,638, issued Feb. 19, 1974.

BACKGROUND OF THE INVENTION

This invention relates to graphical recording with an ink pen system.

In conventional ink pen systems used for graphical recording, a pen traverses a record receiving medium such as ordinary chart paper for depositing ink to form a record. Pen systems used for this purpose include ball point pens and various types of capillary feed pens some of which have employed a pressurized ink supply to augment ink flow for high speed writing. In addition to the usual problems of clogging, bleeding, tearing chart paper and the like, increased writing speeds result in skipping caused by pen bounce and by inadequate ink flow. To date, attempts to solve theses problems have included the use of special inks, specially designed feed reservoirs, and pressurized ink systems which are often pressure modulated as a function of pen speed. Attempts to provide adequate ink flow for high speed writing without having excessive ink flow during low speed writing or when the pen is stopped have been complicated and expensive.

Electrographic recording systems such as those disclosed in U.S. Pat. Nos. 3,342,164-Lewis and 3,371,651-Johnson et al. have utilized adjacent discharge and vacuum ports for applying toner fluid to a latent electrostatic charge pattern. While such systems are effective for the application of toner fluid, they are not easily adapted to an ink pen system where the flow of ink must be confined to a rather limited area to provide a meaningful graphic representation.

SUMMARY OF THE INVENTION

In accordance with this invention, apparatus for applying ink to a record receiving medium comprises a pen having a discharge port coupled to a reservoir means and a vacuum chamber substantially surrounding the discharge port. A pressure differential is provided between the discharge port and the vacuum chamber so as to move the ink through the discharge port and back into the vacuum chamber thereby forming a fountain of ink in contact with the record receiving medium over a very limited area. The pen may comprise a tubular writing member having a discharge port at the end thereof and a collection member surrounding the end forming the vacuum chamber.

In accordance with one very important aspect of the invention, the end of the collection member is spaced from the record receiving medium. In a particularly preferred embodiment, the spacing means comprises a portion of the tubular writing member extending beyond the end of the collection member. In another embodiment of the invention, the means for spacing is located external to the fountain of ink and the ends of the tubular writing member and the collection member are substantially flush.

In operation, the apparatus of this invention directs a fountain of ink toward the record receiving medium such that the receiving medium is contacted at a selected area with the fountain of ink. The area surrounding the fountain of ink is then evacuated so as to confine the area of contact by the fountain of ink to the selected area and remove the ink after contact from the record receiving medium. Preferably, the maximum width of contact of the record receiving medium by the fountain of ink is substantially equal to the maximum cross-sectional dimension of the writing member at the end juxtaposed to the record receiving medium and substantially less than the maximum cross-sectional dimension of the collection port at the end of the collection member. The fountain of ink is independent of and not affected by relative movement or lack of movement between the record receiving medium and the fountain of ink.

In accordance with another important aspect of the invention, vacuum means are coupled to the collection member so as to draw the ink from the discharge port member into the vacuum chamber. In addition, means are coupled to the tubular writing member for generating a pressure therein substantially greater than atmospheric pressure so as to force the ink through the discharge port. A single motor drives the means for establishing a substantial vacuum as well as the means for generating pressure.

BRIEF DESCRIPTION OF THE DRAWINGS

These and other aspects of the invention may be understood from the following description taken in conjunction with the following drawings in which.

DETAILED DESCRIPTION OF PREFERRED EMBODIMENTS

Figure 1:
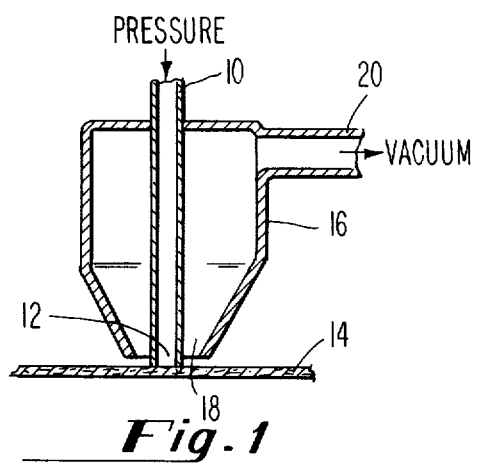
FIG. 1 is a simplified sectional view of an ink pen representing a preferred embodiment of the invention.

FIG. 1 shows an ink pen suitable for producing a continuous trace record as in a conventional XT or XY recording. A writing member or tube 10 has its inner passage connected to a supply of marking liquid or ink under suitable positive pressure for delivering the ink through a discharge port 12. The tip of the tube 10 may advantageously be made uneven so as to provide a passage for the flow of ink between the pen tip at the discharge port 12 and the paper 14 while maintaining the pen tip in contact with or in close proximity to the paper.

Surrounding the pen tube 10 is a collection tube or suction sleeve 16 spaced a small distance away from the chart paper 14 by the end of the tube 10. The collection tube 16 provides a vacuum port 18 and a connection 20 to a suitable vacuum source not shown.

The pen of FIG. 1 is capable of very slow writing speeds without clogging, bleeding or tearing chart paper while also being capable of very high writing speeds with a variety of inks without skipping. In order to provide this capability, the writing tube 10 is coupled to a suitable source of ink under pressure for delivering ink to the writing surface at a flow rate sufficient for the highest writing speed intended and the section 20 of the collector tube 16 is connected to a suitable vacuum source for removing any excess from the printing surface for writing at speeds lower than the maximum or when the pen is stopped. Pens constructed and operated according to this invention have been capable of writing at high speeds and then of being brought to rest indefinitely without bleeding or displaying other undesirable characteristics. Furthermore, demonstrations have shown that such pens can write under conditions of low chart speed and much retracing without clogging or bleeding. These desirable performance capabilities have been achieved with inks having a broad range of characteristics.

Another very important aspect of a pen constructed in accordance with this invention is the nature of the mark formed by the pen. In the embodiment as shown in FIG. 1, the maximum width of the mark is substantially equal to the maximum cross-sectional dimension or outside diameter of the tube 10 at the writing tip and substantially less than the maximum cross-sectional diameter of the collection port or the inside diameter of the collection member 16 at the tip thereof. Thus the evacuation of the area surrounding the discharge port 12 by the collection tube 16 is effective to confine the ink to a desired, limited area. This is accomplished by the forming of a fountain of ink which emanates from the tube 10 at the discharge port 12 and returns to the collection member 16 at the collection port 18 along the exterior of the pen tube 10 rather than flowing outwardly therefrom. In order to generate such a fountain, the collection member 16 must be spaced from the record receiving medium 14. In the embodiment of FIG. 1, this spacing is achieved by a portion of the writing tube 10 which extends beyond the end of the collection tube 16. The spacing is preferably more than 10 and less than 100% of the maximum cross-sectional dimension of the tube 10 at the writing tip thereof. For example, for a writing tube 10 having an outside diameter of 0.010 inches, the preferred spacing would range from 0.002 to 0.010 inches.

Figure 2:
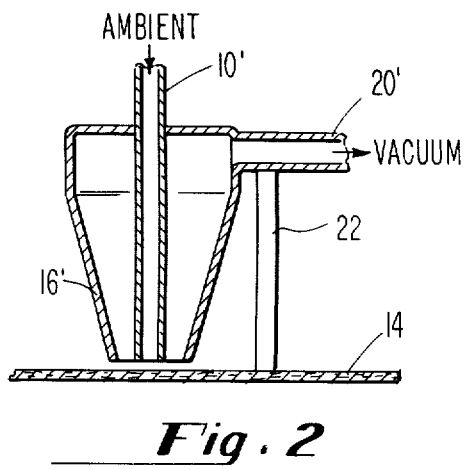
FIG. 2 is a simplified sectional view of an ink pen representing another embodiment of the invention.

In the embodiment of FIG. 2, which is preferable to use under conditions where continued retracing is expected, the writing tube 10' and the collection tube 16' are substantially flush, i.e., the tube 10' does not extend substantially beyond the tube 16'. The spacing of the collection tube 16' from the record receiving medium 14, preferably more than 10 and less than 100% of the maximum cross-sectional dimension of the writing tube 10' at the writing tip thereof, is achieved by a spacing member or foot 22 attached to the section 20' of the collection tube 16' so as to be external to the fountain of ink. As utilized herein, the phrase "substantially flush" means that the distance between the end of the tube 10' and the end of the tube 16' will not exceed 30% of the spacing between the end of the collection tube 16' and the medium 14. This means that the ends of the tubes 10' and 16' are flush within 0.003 of an inch since the maximum preferred spacing between the tube 16' and the medium 14 is 0.010 inches.

Because the pen tube does not touch the paper, it cannot tear or abrade the paper while it is wet by the ink. It will be understood that the spacer leg 22 may be located so that it touches the writing surface only a the spot which has not yet been wet by the ink. Furthermore, in this embodiment, a vacuum applied to the collection tube or suction sleeve 16', is typically enough negative pressure head to cause ink to flow while maintaining ambient pressure on the ink in the tube 10'.

When a pen of this design is lifted off the writing surface, the suction or vacuum no longer serves to draw ink through the pen tube and ink delivery is thus automatically stopped. When the spacer is on the writing surface, the pen produces a fountain of ink in contact with the writing surface. As in the embodiment of FIG. 1, the suction or vacuum produced by the collection tube evacuates the area surrounding the discharge port so as to confine the area of contact between the fountain of ink and the recording medium 14 such that the maximum width of the mark is less than 125% of the outside or maximum cross-sectional dimension of the tube at the writing tip thereof.

In some applications, it may be important to have the pen tip visible so that the record may be viewed continuously as it is made. For this purpose, the suction sleeve may be made of a transparent material. To maintain visibility through the suction sleeve, it may be made from or coated internally with a material which is not wettable by the ink being used. When desired, the spacing member may be made adjustable so that the vacuum may be varied thereby varying the rate of ink flow through the pen tube. When used to write on a curved surface such as a recorder drive roll, the end of the suction sleeve may be curved to conform to the writing surface shape.

The embodiments of the invention as depicted in FIGS. 1 and 2 have been somewhat simplified for purposes of clarity. A complete embodiment of the invention will now be described with reference to FIGS. 3 and 4.

Figure 4:
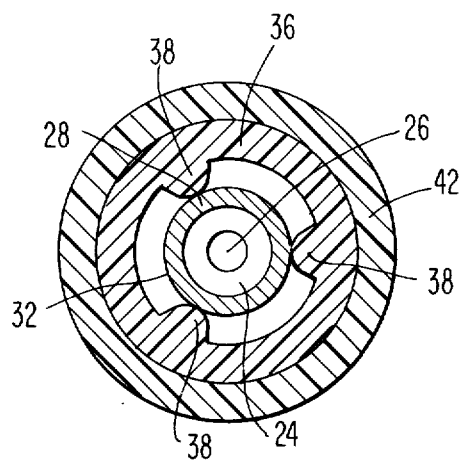
FIG. 4 is a view of the ink pen shown in FIG. 3 taken along line 4—4.
Figure 3:
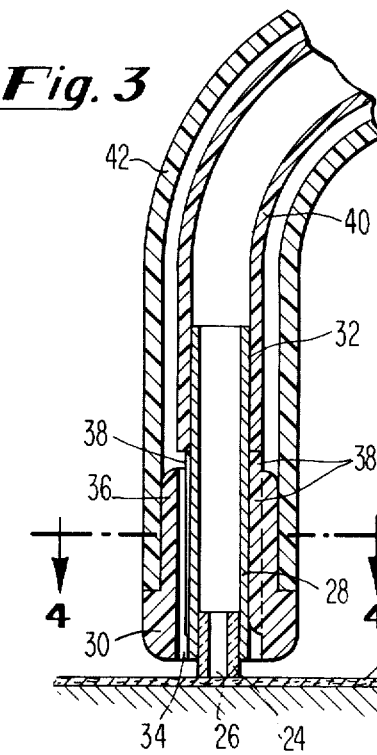
FIG. 3 is a detailed sectional view of an ink pen representing a preferred embodiment of the invention.

As shown in FIGS. 3 and 4, a pen of the general type depicted in FIG. 1 comprises a tubular discharge means including a tubular writing tip 24 having an axially extending discharge port 26 with the end of the writing tip 24 in contact with the record receiving medium 14. The tubular discharge means further comprises a tubular supporting member 28 with a diameter such that the writing tip 24 will be coaxially mounted within the supporting member 28 by a force fit and other suitable means such as welding or cement. A tubular collection means 30 is attached to the supporting tube 28 along surface 32 by suitable means such as a force fit. The collection means includes an annular vacuum port 34 encircling the end of the supporting tube 28 and the writing tip 24. A collar 36 includes a plurality of projections which extend substantially parallel with the axis of the pen so as to provide a plurality of channels between the projections 38 and the supporting tube 28.

In order to supply ink to the discharge port 26 of the pen, a non-collapsible plastic tube 40 extends over the end of the supporting tube 28 remote from the writing tip 24. Another non-collapsible tube 42 extends over the collar 36 of the tubular collection means so as to form a passageway between the plastic tube 40 and the plastic tube 42 in communication with the channels formed by the projections 38 and the vacuum chamber 34. The non-collapsible tube 40 is then connected to a suitable source of ink under pressure while the plastic tube 42 is connected to a suitable vacuum source.

Although the materials of the pen may vary, it is generally preferred to utilize the writing tip 26 comprising a hard material such as sapphire. The supporting tube 28 preferably comprises a material such as teflon or metal. Plastic has been found particularly suitable for use in the tubular collection means 30. By way of illustration, the writing tip 26 may have an inside diameter of 0.009 inches and an outside diameter of 0.014 inches, and the inside diameter of the vacuum port 34 is 0.042 inches. The width of the mark left with this particular combination is 0.015 inches or substantially equal to the outside diameter of the writing tip 26 and substantially less than the inside diameter of the port 34.

In general, the outside diameter of the writing tip utilized in an embodiment of this invention will not exceed 0.10 inches. This of course means that the maximum width of the mark produced by the tip will not exceed 0.125 inches.

Figure 5:
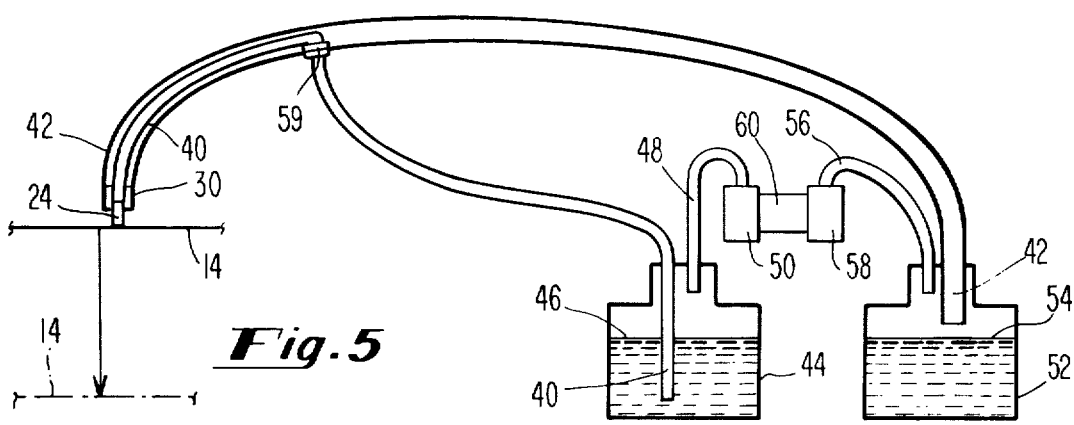
FIG. 5 is a schematic diagram of an ink pen system embodying the invention.

Having described the pen in detail, apparatus will now be described for delivering ink under pressure to the discharge port of the pen and withdrawing ink by means of a vacuum from the collection port of the pen. As shown in FIG. 5, the apparatus comprises reservoir means including a supply ink container 44 having an ink level 46 therein with the tube 40 extending beneath the level 46. In order to force the ink up in to the tube 40, a tube 48 having an end spaced above the level 46 is connected to a pressure pump 50. Since a seal is formed around the tubes 40 and 48 at the top of the container 44 so as to permit the build-up of pressure within the container 44, the ink will be forced up into the tube 40 and carried to the pen.

The ink reservoir means also includes a collecting container 52 having the plastic tube 42 extending to a point above the ink level 54. A tube 56 connected to a vacuum pump 58 is sealed into the top of the container 52 along with the tube 42 so as to pull the ink from the pen through the tube 42 into the container 52. A seal 59 is provided to bring the tube 40 outside the tube 42 in a fluid-tight manner.

In accordance with one important aspect of the invention, the vacuum pump 58 and the pressure pump 50 are driven by a single motor 60. Also, by maintaining the tube 48 and the tube 56 above the ink levels 46 and 54 respectively, there is no circulation of ink through the pressure pump 50 and the vacuum pump 58. This is considered particularly desirable since circulation of ink through the pumps may give rise to system failure due to clogging within the pumps.

The pressure at the discharge port and the vacuum at the collection port of the pen may vary depending upon the nature of the pen and the particular record being made. However, it is generally considered preferable to maintain a vacuum of at least 0.5 inches of mercury at the collection port for the embodiments of FIGS. 1 and 2. Where pressure feed is required as in the embodiment of FIG. 1, it is possible to rely on gravity feed of the ink through the tube 40 by lowering the record receiving medium and the pen below the level 46 of the ink as depicted by the arrow shown in FIG. 5 and thereby eliminate the necessity for the pressure pump 50.

When the collected excess marking fluid in the collecting container 52 is to be returned to the supply container 44 for reuse, the means for effecting the transfer may take many forms. In the most simple means, the two reservoirs are made physically identical so that they may be interchanged as needed to effect the required transfer. A next further degree of complication and attendant convenience could be a simple manually or solenoid operated plunger type pump for transferring marking fluid from the collection to the supply container. Yet another means may be implemented with a suction pump having a pressure connection available at its discharge so that a single pump may be used both to provide suction and to provide a source of driving pressure whereby the same source of suction and pressure used in normal operation may be valved as desired to effect periodic marking fluid transfer. Alternatively, a suction-only pump may be used to provide suction for normal operation and for effecting fluid transfer. When this is done, the marking fluid drive pressure may be obtained from stored energy in a spring or mass loaded device acting on a flexible diaphragm or on a collapsible supply reservoir. In the alternative, the record receiving medium may be positioned below the level 46 of ink in the container 44 so as to provide a gravity feed as indicated in FIG. 5. Of course, no such means are required when the embodiment of FIG. 2 is utilized since a vacuum on the suction sleeve 16' is sufficient to draw the ink through the writing tube 10' due to the configuration of the writing tip and the interaction with the record receiving medium.

These and other modifications may be made without departing from the spirit and scope of the invention as set forth in the appended claims.

What is claimed is:

1. A method of applying ink to a record receiving medium comprising the steps of:
   directing a fountain of ink toward said record receiving medium through a discharge port;
   contacting said record receiving medium at a selected area with said fountain of ink; and
   evacuating the area substantially surrounding said discharge port through a vacuum port so as to confine the fountain of ink to said selected area and remove said ink after contact with said record receiving medium, said selected area having a diameter substantially smaller than the inside diameter of said vacuum port.

2. The method of claim 1 further comprising the steps of:
   moving the record receiving medium relative to the fountain of ink; and
   maintaining the fountain of ink independent of the relative movement between said record receiving medium and said fountain of ink.

3. The method of claim 1 wherein said fountain of ink is directed through a writing tip to the record receiving medium and confined to said selected area of contact with the record receiving medium such that the maximum width of the mark on the record receiving medium is substantially equal to the maximum cross-sectional dimension of the writing tip at the end juxtaposed to the record receiving medium.

4. Apparatus for producing visible marks on a record receiving medium comprising:
   discharge means having a discharge port at the end thereof adapted to extend into marking communication with a record receiving medium so as to discharge marking liquid on the record receiving medium;
   tubular collection means having a collection port substantially the end of said surrounding discharge means, said end of said discharge means protruding substantially beyond the end of said tubular collection means toward the record receiving medium; and
   means coupled to said tubular collection means for establishing a substantial vacuum at said collection port so as to draw said marking liquid from said discharge port into said collection port.

5. The apparatus of claim 4 wherein said discharge means comprises a tubular writing tip having said discharge port at the end thereof, said tip being located centrally of said collection port.

6. The apparatus of claim 5 wherein said discharge means further comprises a tubular supporting member connected to and supporting said tip, said tubular supporting member extending substantially into and connected to said tubular collection means.

7. The apparatus of claim 6 wherein said tubular supporting member is attached to said tubular collection means so as to form said collection port between said tubular collection means and said tubular supporting member.

8. The apparatus of claim 4 wherein said end of said discharge means protrudes beyond said end of said collection means a distance more than 10 and less than 100% of the maximum cross-sectional dimension of said end of said discharge means.

9. Apparatus for recording visible marks comprising:
a record receiving medium;
a pen comprising:
circular discharge means having a circular discharge port at the end thereof adapted to extend into marking communication with said record receiving medium so as to discharge marking liquid on the record receiving medium;
tubular collection means having a collection port substantially surrounding the end of said discharge means and spaced from said record receiving medium, said end of said discharge means being substantially flush with said end of said collection means; and
means coupled to said tubular collection means for establishing a substantial vacuum at said collection port so as to draw said marking liquid from said discharge port into said collection port.

10. The apparatus of claim 9 further comprising reservoir means for ink coupled to said collection means, the pressure within said reservoir means above the ink level being substantially equal to ambient so as to prevent the discharge of ink from said discharge means when said pen is removed from marking communication with said record receiving medium.

11. Apparatus for applying ink to a record receiving medium comprising:
reservoir means containing said ink;
a pen comprising a tubular writing member forming a discharge port coupled to said reservoir means and a tubular collection member substantially surrounding said discharge port and forming a vacuum chamber;
means for moving said ink through said discharge port and back into said vacuum chamber so as to form a fountain of ink in contact with said record receiving medium; and
means for spacing the end of said collection member from said record receiving medium.

12. The apparatus of claim 11 wherein said means for spacing comprises a portion of said tubular writing member extending beyond the end of said collection member.

13. The apparatus of claim 11 wherein said means for spacing comprises a spacer member in contact with said record receiving medium external to said fountain of ink.

14. The apparatus of claim 11 wherein said means for spacing is adapted to space said collector member more than 10 and less than 100% of the overall diameter of said tubular writing member at said discharge port thereof.

15. The apparatus of claim 11 further comprising:
means coupled to said collection member for establishing a substantial vacuum in said vacuum chamber so as to draw the ink from said discharge port into said vacuum chamber;
means coupled to said tubular writing member for generating a pressure therein substantially greater than atmospheric pressure so as to force said ink through said discharge port; and
a single motor coupled to and driving said means for establishing a substantial vacuum and said means for generating pressure.

16. The apparatus of claim 15 wherein said means coupled to said collection member comprises a larger tubular member and said means coupled to said writing member comprises a smaller tubular member extending through a central passageway in said larger tubular member.

17. The apparatus of claim 15 wherein said means for establishing a vacuum comprises a vacuum pump driven by said motor and said means for establishing pressure comprises a pressure pump driven by said motor.

18. The apparatus of claim 15 further comprising reservoir means for ink coupled to said tubular writing member and said collection member, said vacuum pump withdrawing said ink from said collection member to said reservoir means without circulating said ink through said vacuum pump, said pressure pump communicating with said reservoir means for delivering said ink to said tubular writing member from said reservoir means without circulating said ink through said pressure pump.

19. The apparatus of claim 11 further comprising reservoir means for said ink coupled to said tubular collection member, said record receiving medium being positioned below the level of ink in said reservoir means so as to provide a gravity feed of said ink through said writing member.

* * * * *